(12) United States Patent
Siquenique

(10) Patent No.: US 10,402,047 B2
(45) Date of Patent: Sep. 3, 2019

(54) COMMUNICATION DEVICE CRAWLER

(71) Applicant: Joao Siquenique, Meerbusch (DE)

(72) Inventor: Joao Siquenique, Meerbusch (DE)

(73) Assignee: Vadafone Holding Gmbh, Duesseldorf (DE)

( * ) Notice: Subject to any disclaimer, the term of this patent is extended or adjusted under 35 U.S.C. 154(b) by 880 days.

(21) Appl. No.: 14/865,627

(22) Filed: Sep. 25, 2015

(65) Prior Publication Data

US 2016/0098158 A1  Apr. 7, 2016

(30) Foreign Application Priority Data

Oct. 1, 2014  (EP) ..................................... 14187380

(51) Int. Cl.
| | | |
|---|---|---|
| *G06F 3/0482* | (2013.01) | |
| *H04W 88/02* | (2009.01) | |
| *G06F 9/448* | (2018.01) | |

(52) U.S. Cl.
CPC ............ *G06F 3/0482* (2013.01); *G06F 9/449* (2018.02); *H04W 88/02* (2013.01)

(58) Field of Classification Search
CPC .............................. G06F 3/0482; H04W 88/02
See application file for complete search history.

(56) References Cited

U.S. PATENT DOCUMENTS

| | | | | |
|---|---|---|---|---|
| 2005/0125745 | A1* | 6/2005 | Engestrom ............ | G06F 1/1626 715/847 |
| 2005/0229106 | A1* | 10/2005 | Labarge ................ | G06F 16/955 715/745 |
| 2006/0026572 | A1* | 2/2006 | Srivastava .......... | G06F 9/45512 717/136 |
| 2013/0139113 | A1* | 5/2013 | Choudhary ........... | G06F 3/0488 715/847 |
| 2013/0212191 | A1* | 8/2013 | Suraj ....................... | H04L 51/32 709/206 |
| 2014/0136599 | A1* | 5/2014 | Shiue .................. | H04L 67/1095 709/203 |

* cited by examiner

*Primary Examiner* — Anil K Bhargava
(74) *Attorney, Agent, or Firm* — Tarolli, Sundheim, Covell & Tummino L.L.C.

(57) ABSTRACT

A method is disclosed of providing at least one shortcut for accessing a function of a first communication device. The method comprises providing at least one predefined keyword, analyzing a data structure of the first communication device based on the predefined keyword, identifying a data path to a function of the first communication device based on the analysis of the data structure of the first communication device, and automatically proposing a shortcut to be presented to a user of the first communication device. The shortcut points to the function of the first communication device, with function being related to the predefined keyword. The method and corresponding hardware components can be provided as part of a communication device and network components enabling the creation of shortcut on user interfaces of communication device without any knowledge of the data structure of the respective communication device.

19 Claims, 6 Drawing Sheets

COMMUNICATION DEVICE CRAWLER

RELATED APPLICATIONS

The present invention claims priority from EP 14187380.2, filed 1 Oct. 2014, the entirety of which is incorporated herein by reference.

FIELD OF THE INVENTION

The invention relates to a method of providing at least one shortcut for accessing a function of a communication device. The invention further relates to a communication device or network component being adapted to perform the method. The invention finally relates to communication systems being adapted to perform the method and a corresponding computer program product.

BACKGROUND OF THE INVENTION

US 2013/0139113 A1 discloses that a user may initiate recording actions both within an application and outside of an application to perform the task. After recording the actions for the task, a shortcut is created. The shortcut may be accessible from a home display of a mobile device (e.g. a start screen of a smart phone) and/or some other accessible location. The method is complicated and time consuming.

SUMMARY OF THE INVENTION:

It's thus an object of the present invention to provide an improved method for providing a shortcut for accessing a function of a first communication device.

According to a first aspect a method of providing at least one shortcut for accessing a function of a first communication device is provided. The method comprises the steps of:
  providing at least one predefined keyword;
  analyzing a data structure of the first communication device based on the predefined keyword;
  identifying a data path to a function of the first communication device based on the analysis of the data structure of the first communication device;
  automatically proposing a shortcut to be presented to a user of the first communication device, the shortcut pointing to the function of the first communication device, the function being related to the predefined keyword.

The first communication device may be any device which is capable of exchanging data with another communication device by means of any kind of communication channel. Examples of such communication channels may by data networks like the internet, mobile communication networks like GSM-, UMTS-, LTE-networks or, for example, local communication channels like Bluetooth or optical or audio based communication. The first communication device may be a mobile communication device as a mobile phone or a smart phone, a computer, a laptop, a tablet computer and the like being adapted to communicate via one or more communication channel.

The predefined keyword may be any combination of signs like words, numbers, instructions, and the like. The predefined keyword may be related to any function which can be accessed by means of the first communication device. Functions of the first communication device may be any information or executable program which can be accessed by means of or via the first communication device.

The analysis of the data structure may be performed by means of self-learning search or analysis tools such that the time for analyzing the data structure may be reduced after analyzing two, three, four or more first communication devices of the same or similar kind. The same or similar kind of first communication device may be the kind of device as such (e.g. smartphone) and/or, for example, the product provided by a specific manufacturer or company (e.g. apple iPhone 5). The user thus needs no knowledge about the data structure of the first communication device. The method is thus different to the prior art approach in which the user needs a detailed knowledge of the data structure of the mobile device in order to perform the actions to be recorded. The user needs to know where to find the actions in the mobile device in order to generate the shortcut by recording a defined sequence of actions.

The shortcut may be proposed to the user by means of any available presentation unit. The presentation unit may be an optical and/or audio user interface of the first communication device or any other component being authorized to provide a shortcut on the first communication device.

The method may be performed by means of the first communication device, another communication device being connected to the first communication device or any kind of network component being connected with the first communication device.

The step of providing at least one predefined keyword may comprise the steps of:
  analyzing a second communication device regarding a shortcut being available on a second user interface of the second communication device, the shortcut pointing to a function of the second communication device;
  assigning the predefined keyword to the shortcut of the second communication device based on the respective function of the second communication device.

The second communication device may be the same or a different type of device as the first communication device. The first communication device may, for example, be a computer and the second communication device may be a mobile phone. The first and the second communication devices may alternatively be, for example, smartphones of different types.

The analysis of the second communication device may comprise an analysis of a data path of the second communication device which is assigned to a shortcut presented on a graphical user interface of the second communication device. The data path of the shortcut points to an endpoint which defines the function which is related to the shortcut. The function may be, as described above, any information or executable program which can be accessed by means of or via the second communication device. There can be, for example, an adaptable list of keywords which are related to a specific function of the second communication device in view of the characteristics of the first communication device. One, two or more keywords may be related to the same specific function. The keyword may comprise a weight indicating the probability that the predefined keyword is used in a specific first communication device with respect to the same or a comparable function of the first communication device.

The predefined keyword with the highest weight may be used first in order to analyze the data structure of the first communication device. Predefined keywords related to the same function but with a lower weight may be searched if there is no result with respect to predefined keyword with the highest weight. Alternatively or in addition, two or more predefined keywords may be used in order to determine the function related to the keywords such that the likelihood that the correct shortcut is proposed may be increased. The predefined keywords or the list of predefined keywords and the weights may be adapted depending on performance measurement with respect to time of analysis and correctness of the proposed shortcut.

The analysis of the shortcut or shortcuts which are available by means of any optical or audio user interface of the second communication device may be performed by means of the first communication device, another communication device being connected to the second communication device or any kind of network component being connected with the second communication device. It may thus be advantageous to contact the second communication device by means of a communication channel. A detailed analysis of a data path being related to a shortcut being available on a user interface of the second communication device may thus be enabled. Alternatively or in addition, a photo or video of the shortcut and the function activated by means of the shortcut may be used in order to assign the predefined keyword. A similar approach may be used if an acoustical shortcut of the second communication device shall be assigned to a predefined keyword. A microphone or the like may be used in order to record the acoustical shortcut. The recorded acoustical shortcut may in this case be assigned to the predefined keyword. This approach may be supported by means of recoding the function of the second communication device being accessed by means of the respective shortcut. The recording may be performed, for example, by means of a microphone or a camera. An example may be that a first communication device may be used to take a photo of a graphical user interface of the second communication device. The graphical user interface of the second communication device comprises one or more shortcuts. The photo of the shortcuts may be analyzed by means of the first communication device or a network component being connected to the first communication device and one or more predefined keywords may be assigned to the respective shortcut.

A user of a new mobile phone may, for example, be enabled by means of the method to provide a copy of shortcuts being available on an old mobile phone without any knowledge about the data structure especially of the new mobile phone.

The step of providing at least one predefined keyword may comprise the steps of:
 contacting a network resource by means of a communication channel;
 selecting a keyword profile available via the network resource, the keyword profile comprising the predefined keyword;
 sharing the keyword profile with the first communication device.

Potential network resources may be a server or internet applications which comprise keyword profiles like entertainment, business, home organization etc. The keyword profiles may be specified with respect to the first communication device which may, for example, be specified by means of a check box on an internet page in order to assign a predefined keyword to a keyword profile by means of the network resource. The predefined keyword may thus be adapted or optimized with respect to the specific first communication device. The user may select one or more potential functions related to potential shortcuts by means of the respective keyword profile. The selected user specific keyword profile comprising the predefined keyword or keywords related to the function or functions may be shared with the first communication device by exchanging the keyword profile comprising the keywords or the keywords with the first communication device. The first communication device may receive in this case the keywords and perform the analysis of the data structure by means of the method as described above. Alternatively, the network resource may perform the analysis of the data structure of the first communication device based on the specified keyword profile and either propose the shortcut or shortcuts via the a user interface of the first communication device or via a user interface of another communication device which may be used to access the network resource. It may be necessary that the first communication device and the other communication device are connected to the network resource such that the selection of the keyword profile and the analysis of the data structure of the first communication device are enabled. An example may be that the user contacts the network resource by means of an old smartphone. The user may select the keyword profile for a new smartphone which is also connected to the network resource by selecting, for example, parts of the keyword profile "business" comprising one or more business functions and specifying the type of the new smartphone in order to assign the predefined keywords to the keyword profile depending on the type of the new smartphone.

The proposed shortcut may be accepted by means of the user of the first communication device. The keywords within a keyword profile may be adapted depending on the confirmation of proposed shortcuts by means of the user of the first communication device.

The at least one predefined keyword may alternatively be provided by means of the steps of:
 requesting a user input;
 assigning the predefined keyword based on the user input.

The user of the first communication device may, for example, activate an application for shortcut generation which is available on the first communication device. The application may request a user input regarding a function to which a shortcut should be generated on the user interface of the first communication device. The user may input the word "Application 3" and the application for shortcut generation may assign the predefined keyword "test 3" to the user input. The first communication device is analyzed with respect to the predefined keyword and a shortcut is proposed to the user by means of any kind of user interface of the first communication device. The shortcut may finally be automatically generated by means of the application for shortcut generation. Alternatively, a confirmation of the user may be needed in order to generate the shortcut. The shortcut may be, for example, an icon on a graphical user interface, an acoustic order which can be received via a microphone of the first communication device or a combination thereof.

According to a second aspect a communication device is provided. The communication device comprises a first analyzer, an identification unit and a presentation unit. The communication device is adapted to receive a predefined keyword. The first analyzer is adapted to analyze a data structure of the communication device based on the predefined keyword. The identification unit is adapted to identify a data path based on the analysis of the data structure of the first communication device. The presentation unit is adapted to present a shortcut to a user of the communication device, the shortcut pointing to a function of the communication device, the function being related to the predefined keyword.

The communication device may be a first communication device which is accordingly adapted as described above. The first analyzer and the identification unit may be specific hardware components or one or more software component stored on a memory device of the communication device and running on a processor or microprocessor of the communication device. The presentation unit may be any kind of user interface like, for example, a display or a loudspeaker of the communication device. The communication device is adapted to determine and propose a shortcut to a function of the communication device. The function may be any information or executable program which can be accessed by means of or via the first communication device.

The communication device may further comprise a first communication interface for providing a connection to a network component of a communication network, wherein the communication device is adapted to receive the predefined keyword via the first communication interface.

The first communication interface may be any wired or wireless interface which may be suited exchange data with other devices.

The communication device may further comprise a second communication interface, a second analyzer and an assigning unit. The second communication interface is adapted to contact a second communication device. The second analyzer is adapted to analyze the second communication device regarding a shortcut being available on a user interface of the second communication device, the shortcut pointing to a function of the second communication device. The assigning unit is adapted to assign a keyword to the shortcut of the second communication device based on the respective function of the second communication device. The communication device is adapted to receive the assigned keyword as predefined keyword.

The second analyzer and the assigning unit may be a specific hardware components or one or more software component stored on a memory device of the communication device and running on a processor or microprocessor of the communication device. The second analyzer and the assigning unit may be, for example, part of one application program together with the first analyzer and the identification unit. The second communication interface may be any wired or wireless interface which may be suited exchange data with other devices. The second communication interface may be different from or be identical with the first communication interface. The second communication interface may be, for example, a microphone or camera. The user interface of the second communication device may be, for example, a graphical user interface using a display and/or an audio interface using a microphone and a loudspeaker. The shortcut available at the user interface of the second communication device may be an icon on the display or a spoken order to start, for example, an action on the second communication device. The communication device may thus be enabled to determine shortcuts available at the user interface of the second communication device by means of data received via the second communication interface. Keywords are assigned to the shortcuts of the second communication interface. The keywords may only be assigned in view of the shortcuts available on the user interface of the second communication device. Alternatively, the keywords may be adapted depending on the type of the communication device for which the shortcuts shall be proposed because the same or similar functions of different communication devices may be related to different keywords. The assigned keywords are used by means of the communication device as predefined keywords in order to determine and propose wanted shortcuts to functions of the communication device.

According to a further aspect a first network component of a mobile communication network is proposed. The first network component comprises a first network communication interface, a first network analyzer and a network identification unit. The first network communication interface is adapted to provide a connection to a first communication device. The first network analyzer is adapted to analyze a data structure of the first communication device based on a predefined keyword. The network identification unit is adapted to identify a data path based on the analysis of the data structure of the first communication device. The first network component is adapted to transmit to the first communication device via the first network interface a proposal of a shortcut to be presented to a user of the first communication device, the shortcut pointing to a function of the first communication device, the function being related to the predefined keyword.

The first network component may comprise a server computer, a network node or a distributed arrangement using more than one server computer and/or network node. The first network analyzer and the network identification unit may be specific hardware components or one or more software component stored on one or more memory devices of the first network component and running on one more processors or microprocessors of the first network component. The first network communication interface may be any wired or wireless interface which may be suited exchange data with other devices like the first communication device. The first communication device may or may not be adapted as the communication device described above. The first network component enables an analysis of the first communication device in order to propose the requested shortcut. The first network component may offer keyword profiles in order to determine the predefined keywords as described above.

The first network component may comprise a second network communication interface, a second network analyzer and a network assigning unit. The first network component is adapted to contact a second communication device by means of the second network communication interface. The second network analyzer is adapted to analyze the second communication device regarding a shortcut being available on a user interface of the second communication device. The shortcut points to a function of the second communication device. The network assigning unit is adapted to assign a keyword to the shortcut of the second communication device based on the respective function of the second communication device. The first network component is further adapted to provide the keyword as predefined keyword to the first communication device via the first network communication interface.

The second network analyzer and the network assigning unit may be specific hardware components or one or more software component stored on one or more memory devices of the first network component and running on one more processors or microprocessors of the first network component. The second network analyzer and the network assigning unit may be, for example, part of one internet application program together with the first network analyzer and the network identification unit. The second network communication interface may be any wired or wireless interface which may be suited exchange data with other devices like the first and the second communication devices. The second network communication interface may be different from or be identical with the first network communication interface.

The first network component may enable to provide a copy of one or more shortcuts available on the second communication device on the first communication device. The copy may be initiated and controlled by means of the first, the second or a third communication device.

The first network component may have the advantage that the determination of predefined keywords may be easily updated by means of feedback of the users who initiate the generation of shortcuts.

According to a further aspect a second network component is provided. The second network component comprises a first network communication interface, a second network communication interface, a second network analyzer and a network assigning unit. The second network component is adapted to contact a second communication device by means of the second network communication interface. The second network analyzer is adapted to analyze the second communication device regarding a shortcut being available on a user interface of the second communication device. The shortcut points to a function of the second communication device. The network assigning unit is adapted to assign a keyword to the shortcut of the second communication device based on the respective function of the second communication device. The second network component is further adapted to provide the keyword as a predefined keyword via the first network communication interface.

The second network component may be identically or similarly arranged as the first network component. The second network component provides the predefined keywords by analyzing the second communication device but does not necessarily perform the analysis of the first communication device on which the shortcut shall be created. The predefined keywords provided by means of the second network component may depend on the first communication device. The latter may be easily performed by identifying the type of first communication device e.g. by manual input or automatically when connected to the second network component.

The second network component may be part of a system in combination with a communication device as described above. The communication device uses the predefined keywords generated by means of the second network component in order to propose corresponding shortcuts.

According to a further aspect a computer program product is provided. The computer program product comprises code means which can be saved on one or more memory devices of a communication device and/or a network component. The code means is arranged such that the method according to any one of the claims 1 to 7 can be executed by means of one or more processors of the communication device and/or the network component.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principal sketch of a process flow according to the method of the present invention.

FIG. 2 shows a principal sketch of a communication device according to a first embodiment.

FIG. 3 shows a principal sketch of a communication device according to a second embodiment.

FIG. 4 shows a principal sketch of creating a shortcut according to a special embodiment of the second embodiment.

FIG. 5 shows a principal sketch of a communication device according to a third embodiment.

FIG. 6 shows a principal sketch of a first network component according to a first embodiment.

FIG. 7 shows a principal sketch of a first network component according to a second embodiment.

FIG. 8 shows a principal sketch of a system comprising a second network component according to a first embodiment.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
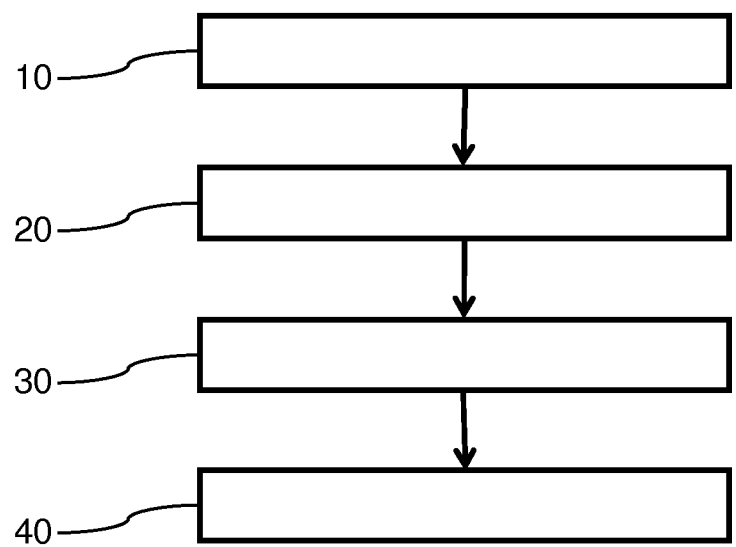

FIG. 1 shows a principal sketch of a process flow according to the method of the present invention. At least one predefined keyword is provided in step 10 to a first communication device 90. A data structure of the first communication device 90 is analyzed in step 20 based on the predefined keyword. Based on the analysis of the data structure a data path to a function of the first communication device 90 is identified in step 30. In step 40 a shortcut presented to a user of the first communication device is automatically proposed. The shortcut points to the function of the first communication device 90. The function is related to the predefined keyword.

Figure 2:
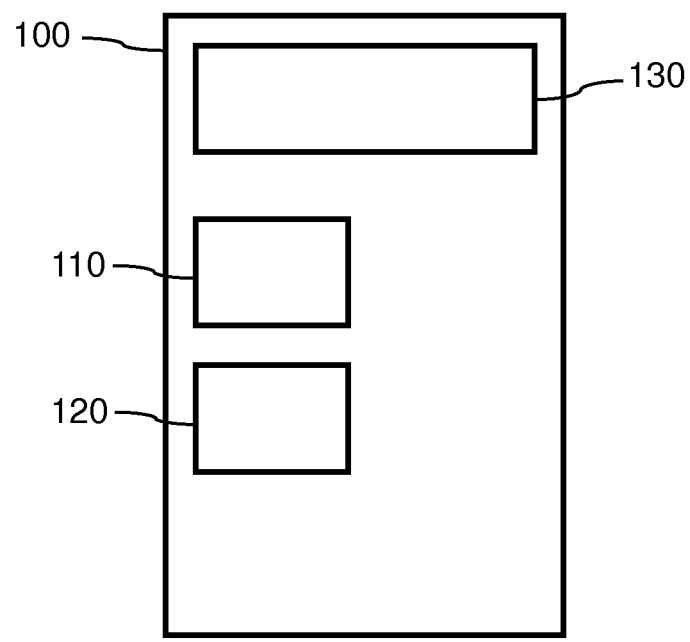

FIG. 2 shows a principal sketch of a communication device 100 according to a first embodiment. The communication device 100 comprises a first analyzer 110, an identification unit 120 and a presentation unit 130. The communication device is a tablet computer. The first analyzer 110 and the identification unit 120 are comprised by a shortcut software application stored in a memory of the tablet computer and running on the main processor of the tablet computer. The presentation unit 130 is a touchscreen of the tablet computer. The user of the tablet computer starts the shortcut software application and the shortcut software application request a user input. The user input is in this case a word which is related to another application stored in the memory of the tablet computer. The user input as such or a related keyword is used as predefined keyword. The shortcut software application analyzes the data structure of the tablet computer based on the predefined keyword and identifies a data path to an application which is most likely the searched application. A shortcut to the application is proposed by generating a related icon on the touchscreen. The user may accept the shortcut by keeping the icon or may delete the icon if the icon does not represent the requested application.

Figure 3:
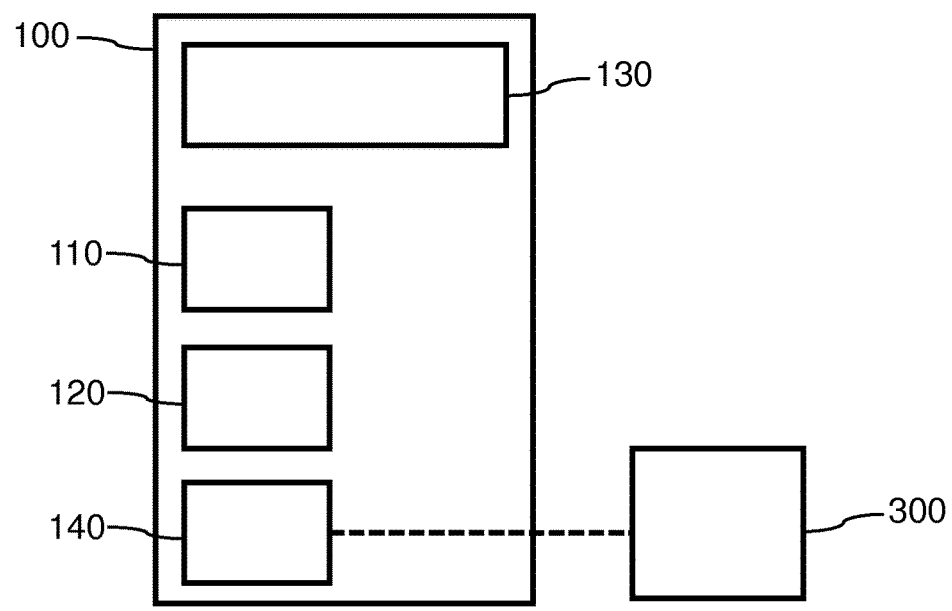
Figure 4:
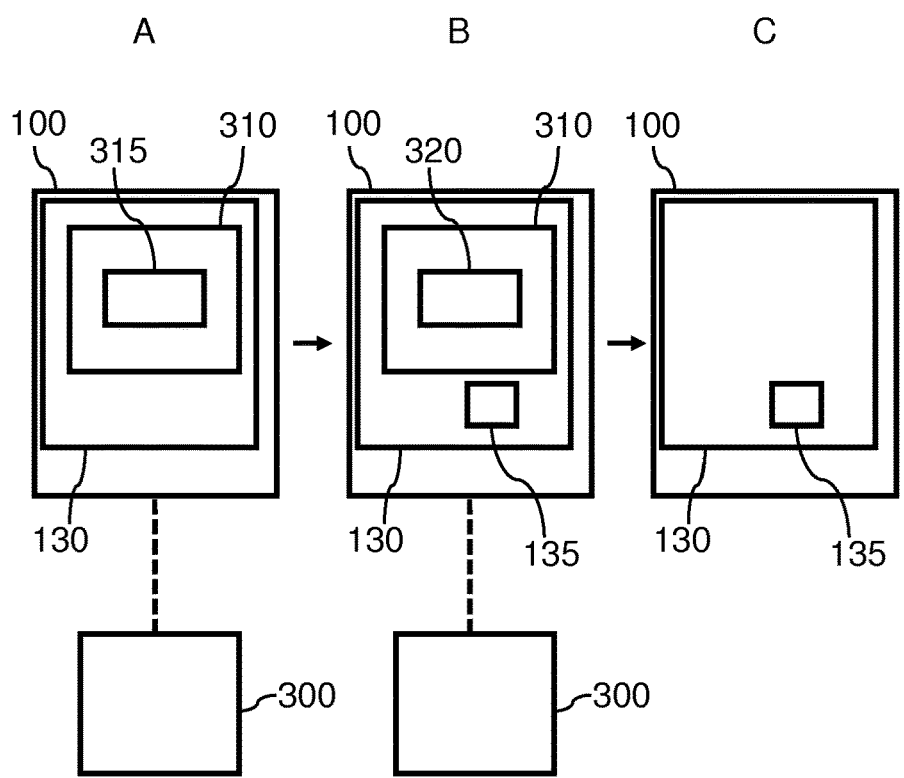

FIG. 3 shows a principal sketch of a communication device 100 according to a second embodiment. The communication device 100 is a smartphone. The smartphone comprises a first analyzer 110, an identification unit 120, a presentation unit 130 and a first communication interface 140. The first analyzer 110 and the identification unit 120 are comprised by a shortcut software application stored in a memory of the smartphone and running on the main processor of the smartphone. The presentation unit 130 is a touchscreen of the smartphone. The user of the smartphone starts the shortcut software application and the shortcut software application contacts a network resource 300 via the first communication interface 140. The first communication interface 140 is a wireless interface for connecting to a wireless local area network (WLAN). The network resource is a service homepage of a service provider in the internet. The details of the shortcut proposal process are discussed with respect to FIG. 4. After starting the shortcut software application a web page window 310 is opened in step A on the touchscreen of the smartphone. The web page window 310 comprises an input window 315 by means of which the user can select and adapt a keyword profile which comprises at least one predefined keyword which may be related to a function of the smartphone. The predefined keyword or keywords are transferred via the WLAN interface of the smartphone and the data structure of the smartphone is analyzed in order to determine a data path to the function of the smartphone. In step B is a confirmation window 320 is displayed within the web page window 310 and an icon 135 for activating the shortcut on the touchscreen of the smartphone. The offered icon 135 representing the shortcut is kept on the touchscreen upon acceptation via the confirmation window 320 as shown in step C.

Figure 5:
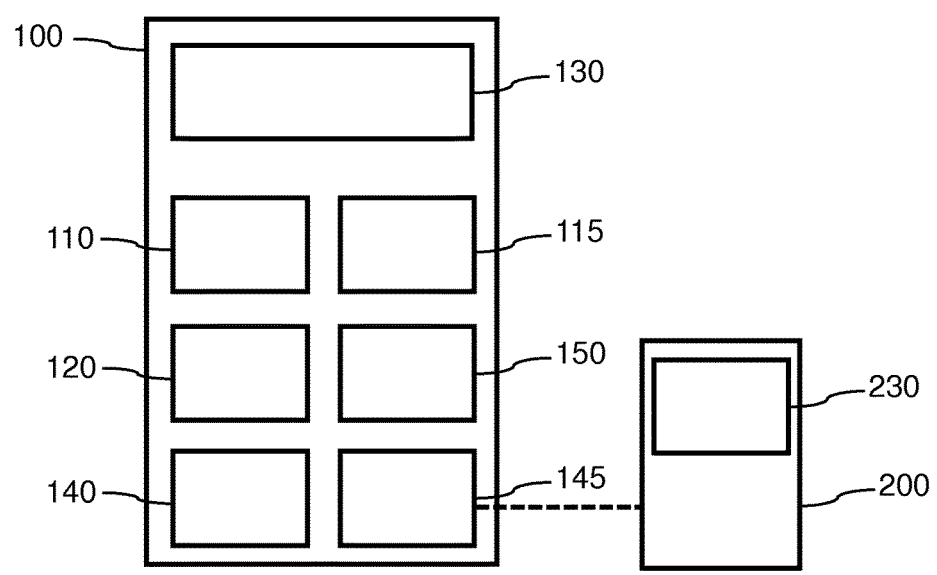

FIG. 5 shows a principal sketch of a communication device according to a third embodiment. The communication device 100 is a smartphone. The smartphone 100 comprises a first analyzer 110, a second analyzer 115 an identification unit 120, a presentation unit 130, a first communication interface 140, a second communication interface 145 and an assigning unit 150. The first analyzer 110, the second analyzer 115, the identification unit 120,c and the assigning unit 150 are comprised by a shortcut software application stored in a memory of the smartphone and running on a processor comprised by the smartphone. The presentation unit 130 is a touchscreen of the smartphone 100. The smartphone 100 is connected via the second communication interface 145 to second communication device 200 which is a computer with a user interface 230. The user interface 230 is a display comprised by the computer 200. The second communication interface 145 is a Bluetooth interface for contacting the computer 200. The computer 200 is analyzed by means of the shortcut software application with respect to shortcuts pointing to functions of the computer which are presented on the display. Keywords are assigned to shortcuts on the display of the computer based on the analysis. The keywords are predefined keywords used to determine and propose shortcuts as described above.

The predefined keywords enable the automatic creation of shortcuts which are related to similar or identical functions of different communication devices. Keywords used for creating shortcuts on a smartphone of a first company being related to a specified function may be different to keywords for creating shortcuts on a smartphone of a second company being related to the specified function or a similar function. The first communication interface 140 which is in this case an interface to an UMTS communication network may be used to update keywords or combination of keywords and optionally weights assigned to the keywords by means of a service provider. The shortcut software application may submit for this purpose information regarding the acceptance of the proposed keywords to the service provider.

Figure 6:
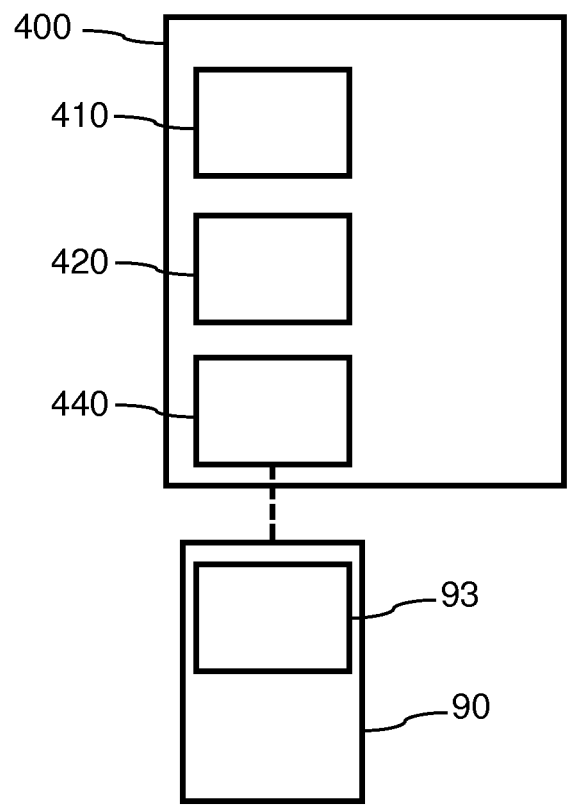

FIG. 6 shows a principal sketch of a first network component 400 according to a first embodiment. The principal discussed with respect to the communication device described above can also be realized by means of the first network component 400 which is in this case a network node in a mobile communication network. The network node comprises a first network analyzer 410, a network identification unit 420 and a first network communication interface 440. The first network analyzer 410 and the identification unit 420 are comprised by software stored in a memory which is comprised by the network node and running on a processor comprised by the network node. The network node is connected via the first network communication interface 440 to a first communication device 90 which is a mobile phone with a user interface 93. The user interface 93 is a display of the mobile phone. The network node is contacted by the mobile phone and the software is started. The software analyzes upon authorization of the user of the mobile phone the data structure, determines the data path and proposes a shortcut which may be an icon on the display of the mobile phone.

Figure 7:
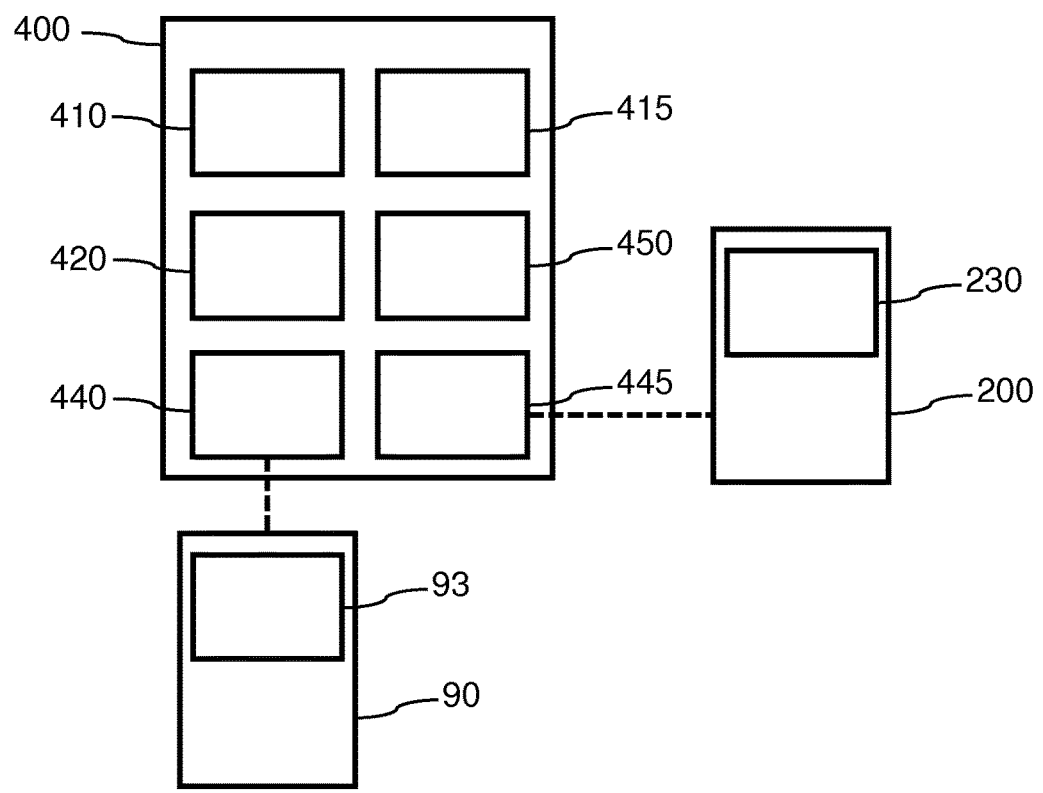

FIG. 7 shows a principal sketch of a first network component 400 according to a second embodiment. The first network component 400 is a server connected to the internet. The server comprises a first network analyzer 410, a second network analyzer 415, a network identification unit 420, a first network communication interface 440, a second network communication interface 445 and a network assigning unit 450. The first network analyzer 410, the second network analyzer 415, the network identification unit 420 and the network assigning unit 450 are comprised by software stored in a memory of the server 400 and running on a processor of the server 400. The server is connected via the first network communication interface 440 to a first communication device 90 which is a smartphone with a user interface 93 and via the second network communication interface 445 to a second communication device 200 which is a mobile phone with a user interface 230. The user interfaces 93, 230 are displays of the smartphone 90 and the mobile phone 200. The server is contacted by means of the smartphone 90 and the software is started. The software analyzes, upon authorization of the user of the mobile phone 200, available shortcuts and related functions and assigns corresponding keywords which are used as predefined keywords. The software further analyzes, upon authorization of the user of the smartphone 90, the data structure based on the predefined keyword, determines the data path, and proposes a shortcut, which may be an icon on the display.

Figure 8:
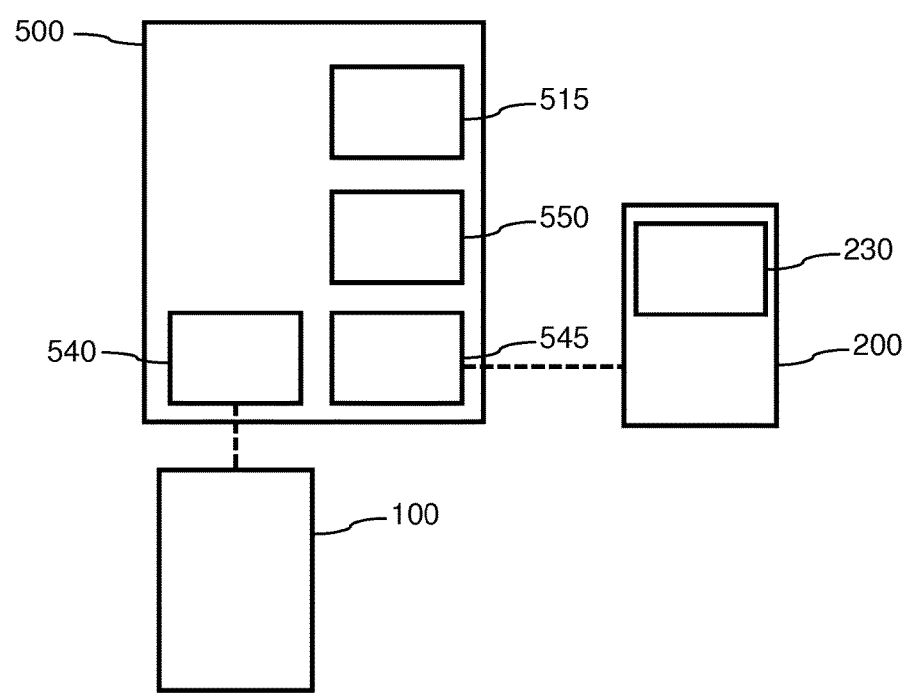

FIG. 8 shows a principal sketch of a system comprising a second network component according to a first embodiment. The second network component 500 is a server on the internet. The server comprises a second network analyzer 515, a first network communication interface 540, a second network communication interface 545 and a network assigning unit 550. The second network analyzer 515 and the network assigning unit 550 are comprised by software stored in a memory of the server 500 and running on a processor of the server 500. The server 500 is connected via the first network communication interface 540 to a communication device 100 as discussed with reference to FIGS. 3 and 4 and the corresponding description. The server 500 is further connected via the second network communication interface 545 to a second communication device 200 which is a mobile phone with a user interface 230. The user interface 230 is a display of the mobile phone 200. The server 500 is contacted by means of the mobile phone 200 and the software is started. The software analyzes, upon authorization of the user of the mobile phone, available shortcuts and related functions and assigns corresponding keywords. The software further transfers the keywords to the communication device 100 which uses the keywords as predefined keywords and proposes a corresponding shortcut to the user of communication device 100 as described above.

The second network may alternatively be connected to a first network component as described in FIG. 6 and the corresponding description.

It's a basic idea of the present invention to provide a method and corresponding hardware components as communication device and network components enabling the creation of shortcut on user interfaces of communication device without any knowledge of the data structure of the respective communication device. Predefined keywords are used which are related to functions which can be accessed by means of the respective shortcut. The predefined keywords are preferably adapted to the communication device. This may enable an efficient analysis of the data structure of the communication device in order to find the related function and offer a shortcut by means of a user interface of the communication device to the function.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 step of providing keyword
20 step of analyzing data structure
30 step of identifying data path
40 step of proposing shortcut
90 first communication device
93, 230 user interface
100 communication device
110 first analyzer
115 second analyzer
120 identification unit
130 presentation unit
135 icon for activating shortcut
140 first communication interface
145 second communication interface
150 assigning unit
200 second communication device
300 network resource
310 web page window
315 input window
320 confirmation window
400 first network component
410 first network analyzer
415, 515 second network analyzer
420 network identification unit
440, 540 first network communication interface
445, 545 second network communication interface
450, 550 network assigning unit
500 second network component

The invention claimed is:

1. A method of providing at least one shortcut for accessing a function of a first communication device comprising the steps of:
    providing at least one predefined keyword based on a user input to the first communication device, the providing at least one predefined keyword comprising:
        contacting a network resource via a communication channel;
        selecting a keyword profile available via the network resource, the keyword profile comprising the at least one predefined keyword; and
        sharing the keyword profile with the first communication device;
    analyzing, by the network resource, a data structure of the first communication device based on the predefined keyword, enabled by a connection to the network resource of the first communication device and a second communication device;
    identifying a data path to a function of the first communication device based on the analysis of the data structure of the first communication device; and
    automatically proposing a shortcut to be presented to a user of the first communication device, the shortcut pointing to the function of the first communication device, the function being related to the predefined keyword,
    wherein the shortcut is an icon on a graphical user interface viewed on a display of the first communication device or a spoken order provided to an audio interface via a microphone of the first communication device,
    wherein the first communication device is a smartphone used by the user and wherein the second communication device is a smartphone used by the user prior to the user's use of the first communication device.

2. The method according to claim 1, wherein the step of providing at least one predefined keyword comprises the steps of:
    analyzing a second communication device regarding a shortcut being available on a user interface of the second communication device, the shortcut pointing to a function of the second communication device; and
    assigning the predefined keyword to the shortcut of the second communication device based on the respective function of the second communication device.

3. The method according to claim 2, comprising the additional step of:
    contacting the second communication device by means of a communication channel.

4. The method according to claim 1, wherein the step of providing at least one predefined keyword comprises the steps of:
    requesting the user input;
    assigning the predefined keyword based on the user input.

5. The method according to claim 1, wherein the method comprises the further step of generating the shortcut at a user interface of the first communication device upon acceptation of the proposed shortcut by means of the user of the first communication device.

6. The method according to claim 1, wherein the method comprises the further step of automatically generating the shortcut at a user interface of the first communication device.

7. The method according to claim 1, wherein the at least one predefined keyword has an associated weight assigned by a service provider of the first communication device, the weight indicating a probability that the at least one predefined keyword is used in the first communication device with respect to the function of the first communication device that is the same as or comparable to a corresponding function of the second communication device.

8. A communication device comprising:
a first analyzer;
an identification unit; and
a presentation unit,
the communication device being adapted to receive, from a keyword profile available from a network resource via a communication channel, a predefined keyword based on a user input to the communication device, the keyword profile comprising the at least one predefined keyword,
the first analyzer being adapted to analyze a data structure of the communication device based on the predefined keyword, enabled by a connection to the network resource of the communication device and a second communication device,
the identification unit being adapted to identify a data path based on the analysis of the data structure of the communication device, and
the presentation unit being adapted to present a shortcut to a user of the communication device, the shortcut pointing to a function of the communication device, the function being related to the predefined keyword,
wherein the shortcut is an icon on a graphical user interface viewed on a display of the communication device or a spoken order provided to an audio interface via a microphone of the communication device, and
wherein the communication device is a smartphone used by the user and wherein the second communication device is a smartphone used by the user prior to the user's use of the communication device.

9. The communication device according to claim 8, the communication device further comprising a first communication interface for providing a connection to a network resource of a communication network, wherein the communication device is adapted to receive the predefined keyword via the first communication interface.

10. The communication device according to claim 8, the communication device further comprising:
a second communication interface;
a second analyzer; and
an assigning unit,
the second communication interface being adapted to contact the second communication device,
the second analyzer being adapted to analyze the second communication device regarding a shortcut being available on a user interface of the second communication device, the shortcut pointing to a function of the second communication device,
the assigning unit being adapted to assign a keyword to the shortcut of the second communication device based on the respective function of the second communication device, and
the communication device being adapted to receive the assigned keyword as predefined keyword.

11. A non-transitory computer-readable medium having computer readable program code stored thereon, the program code being configured to execute the method according to claim 1 using one or more processors of the first communication device and/or a network component.

12. A communication system comprising the communication device of claim 8 and the communication system further comprising:
a second network component comprising:
a first network communication interface,
a second network communication interface, a second network analyzer, and
a network assigning unit,
the second network component being adapted to contact a second communication device by means of the second network communication interface,
the second network analyzer being adapted to analyze the second communication device regarding a shortcut being available on a user interface of the second communication device, the shortcut pointing to a function of the second communication device,
the network assigning unit being adapted to assign a keyword to the shortcut of the second communication device based on the respective function of the second communication device, the second network component being further adapted to provide the keyword as a predefined keyword via the first network communication interface.

13. A method of providing at least one shortcut for accessing a function of a first communication device comprising the steps of:
a user starting a shortcut software application to open an application window on a touchscreen of the first communication device, the first communication device being a smartphone, the application window comprising an input window;
providing at least one predefined keyword based on a user input to the first communication device, the providing at least one predefined keyword comprising:
contacting a network resource by means of a communication channel;
selecting a keyword profile available via the network resource by the user performing the selecting the keyword profile via the input window, the keyword profile comprising the at least one predefined keyword;
sharing the keyword profile with the first communication device; and
transferring the at least one predefined keyword from the network resource to the first communication device;
analyzing a data structure of the first communication device based on the predefined keyword;
identifying a data path to a function of the first communication device based on the analysis of the data structure of the first communication device;
automatically proposing a shortcut to be presented to the user of the first communication device by displaying a confirmation window within the application window and offering the icon as an icon for activating the shortcut on the touchscreen of the smartphone, the shortcut pointing to the function of the first communication device, the function being related to the predefined keyword, the shortcut being an icon on a graphical user interface viewed on a display of the first communication device; and
keeping the icon for activating the shortcut on the touchscreen of the smartphone based on the user accepting the confirmation window.

14. The method according to claim 13, wherein the step of providing at least one predefined keyword comprises the steps of:
analyzing a second communication device regarding a shortcut being available on a user interface of the second communication device, the shortcut pointing to a function of the second communication device; and assigning the predefined keyword to the shortcut of the second communication device based on the respective function of the second communication device.

15. The method according to claim 14, comprising the additional step of:

contacting the second communication device via the communication channel or another communication channel.

16. The method according to claim 13, wherein the step of providing at least one predefined keyword comprises the steps of:

requesting the user input;

assigning the predefined keyword based on the user input.

17. The method according to claim 13, wherein the method comprises the further step of generating the shortcut at a user interface of the first communication device upon acceptation of the proposed shortcut by means of the user of the first communication device.

18. The method according to claim 13, wherein the method comprises the further step of automatically generating the shortcut at a user interface of the first communication device.

19. A non-transitory computer-readable medium having computer readable program code stored thereon, the program code being configured to execute the method according to claim 13 using one or more processors of the first communication device and/or a network component.

* * * * *